United States Patent [19]
Oddenino

[11] Patent Number: 4,786,454
[45] Date of Patent: Nov. 22, 1988

[54] PROCESS FOR THE PRODUCTION OF FLEXIBLE CONNECTORS

[75] Inventor: Manrico Oddenino, Buttigliera Alta, Italy

[73] Assignee: Illinois Tool Works, Chicago, Ill.

[21] Appl. No.: 907,885

[22] Filed: Sep. 16, 1986

[30] Foreign Application Priority Data

Sep. 17, 1985 [IT] Italy .............................. 67784 A/85

[51] Int. Cl.⁴ .............................................. B29C 45/14
[52] U.S. Cl. ................... 264/157; 264/229; 264/251; 264/297.2; 264/334; 425/116; 425/315; 425/553
[58] Field of Search ............ 264/1.5, 157, 229, 297.2, 264/251, 145, 334; 425/116, 122, 315, 553

[56] References Cited

U.S. PATENT DOCUMENTS

| | | | |
|---|---|---|---|
| 2,288,899 | 7/1942 | Gits | 425/122 |
| 2,794,211 | 6/1957 | Brown et al. | 425/122 |
| 2,965,932 | 12/1960 | Knowles | 264/251 |
| 3,135,020 | 6/1964 | Holl et al. | 264/251 |
| 3,301,931 | 1/1967 | Morin | 264/157 |
| 4,152,798 | 5/1979 | Akaura et al. | 264/297.2 |
| 4,190,690 | 2/1980 | Robeneck et al. | 264/157 |
| 4,229,402 | 10/1980 | Villarruel et al. | 264/15 |
| 4,636,347 | 1/1987 | Kato | 264/154 |

FOREIGN PATENT DOCUMENTS

| | | | |
|---|---|---|---|
| 120008 | 9/1980 | Japan | 264/1.5 |
| 40806 | 4/1981 | Japan | 264/1.5 |
| 82218 | 7/1981 | Japan | 425/122 |

*Primary Examiner*—James Lowe
*Attorney, Agent, or Firm*—John P. O'Brien; T. W. Buckman

[57] ABSTRACT

A process is described which allows continuous flexible connectors to be produced, particularly for vehicles, provided with at least one stop element a flexible cable wound in a coil is stretched between two facing mould halves and clamped to lie between these; at least one attachment element of synthetic plastics material is hot formed onto the cable in such a way as to embed this and remain rigidly connected thereto; then the mould halves are separated expelling the element thus formed and the cable is advanced in such a way as to bring a new section of cable between the mould halves; finally, a segment of cable, provided with the attachment element, is cut from the flexible cable.

2 Claims, 3 Drawing Sheets

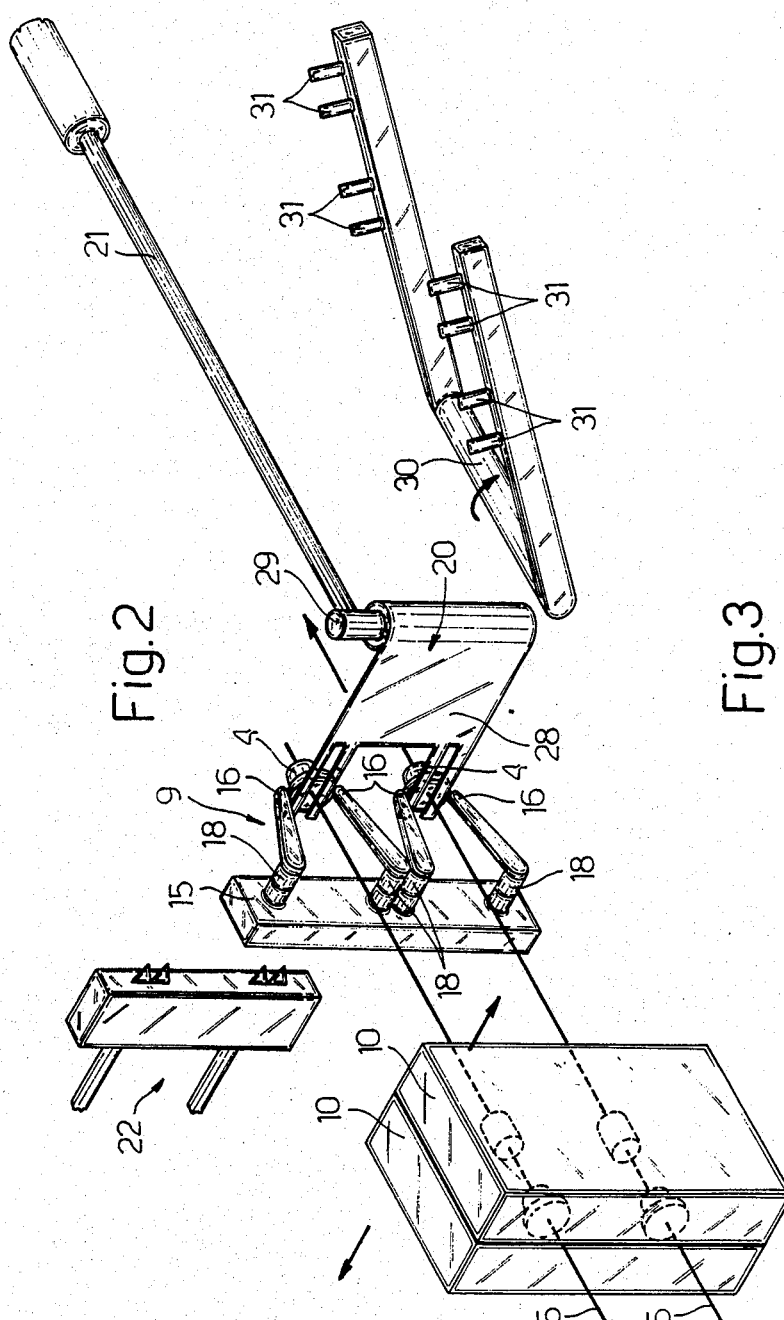
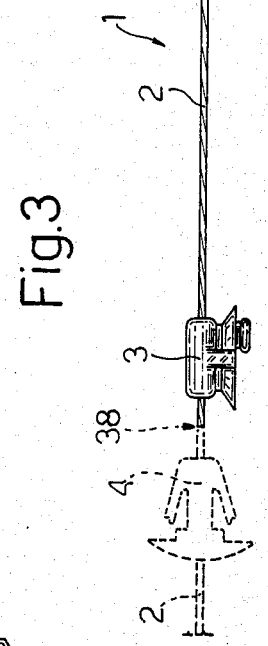
Fig.2
Fig.3

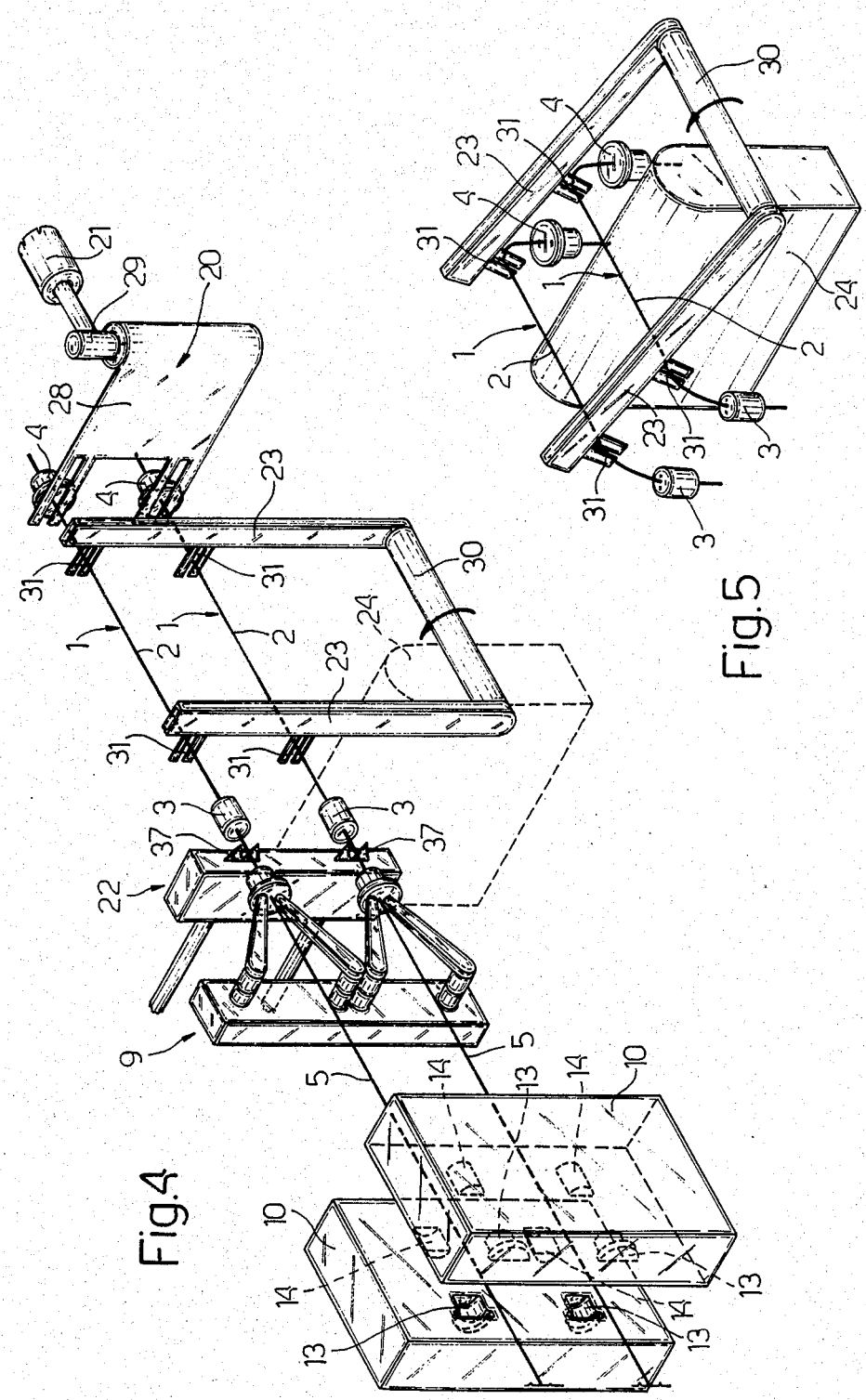

PROCESS FOR THE PRODUCTION OF FLEXIBLE CONNECTORS

BACKGROUND OF THE INVENTION

The present invention relates to a process for the production of flexible connectors comprising a segment of flexible cable having at least one firmly secured attachment element made of plastics material; in particular, the invention relates to a process for producing connectors for the luggage space cover panels or rear shelves of motor vehicles, and to apparatus for putting such process into effect.

It is known that wide use is made in motor vehicles of flexible connectors for numerous upholstery applications and for the support of the luggage space cover panels of motor vehicles provided with hatchback rear doors. Such connectors are usually made of a length or segment of flexible cable, for example made of nylon (registered trade mark) strands, along which are fixed one or several attachment elements usually made of plastics; such elements are produced by moulding separately, and are then fitted to the pieces of cable, already cut to length, usually by crimping or by means of knots. It is clear that such a procedure is the cause of low productivity and makes any attempts at automation of the production very difficult; moreover the cost of connectors thus produced, as well as those possibly made by moulding in one piece in elastomeric material, is relatively high.

SUMMARY OF THE INVENTION

The object of the invention is to provide a process for the low cost construction of flexible connectors of the type described above, which, moreover, permits a high productivity and automation of all the production operations to be obtained easily.

The object is achieved by the invention in that it relates to a process for the production of connectors comprising a segment of flexible cable and at least one attachment element of synthetic plastics material fixed securely to cable segment, characterised by the fact that it comprises the steps of :

drawing off a continuous flexible cable wound on a coil through a pair of facing mould halves which are relatively movable towards one another;

bringing the mould halves together in such a way as to clamp between them a section of the flexible cable and directly hot forming securely onto this latter at least one attachment element of synthetic plastics material embedding the flexible cable within its interior;

separating the mould halves in such a way as to expel from them the formed attachment element securely fixed on the flexible cable;

advancing the cable parallel to its length in such a way as to unwind the coil and bring a free section of the flexible cable between the mould halves, spacing from these latter the previously expelled attachment element; and cutting from the flexible cable a segment of cable of predetermined length provided with a attachment element.

The invention further relates to apparatus for the production of flexible connectors, characterised in that it comprises a pair of facing mould halves relatively movable towards one another, means for drawing between the mould halves at least one continuous flexible cable wound in a coil on a respective freely rotatable drum, means for causing the cable to be moved parallel to its length, and means for cutting an end segment from the cable.

BRIEF DESCRIPTION OF THE DRAWINGS

For a better understanding of the invention there is now given a non-limitative description of an embodiment, with reference to the attached drawings, in which:

FIGS. 2, 4 and 5 schematically illustrate further steps in the process of the invention; and FIG. 3 illustrates a connector obtained using the process of the invention.

DETAILED DESCRIPTION OF THE INVENTION

Figure 1:
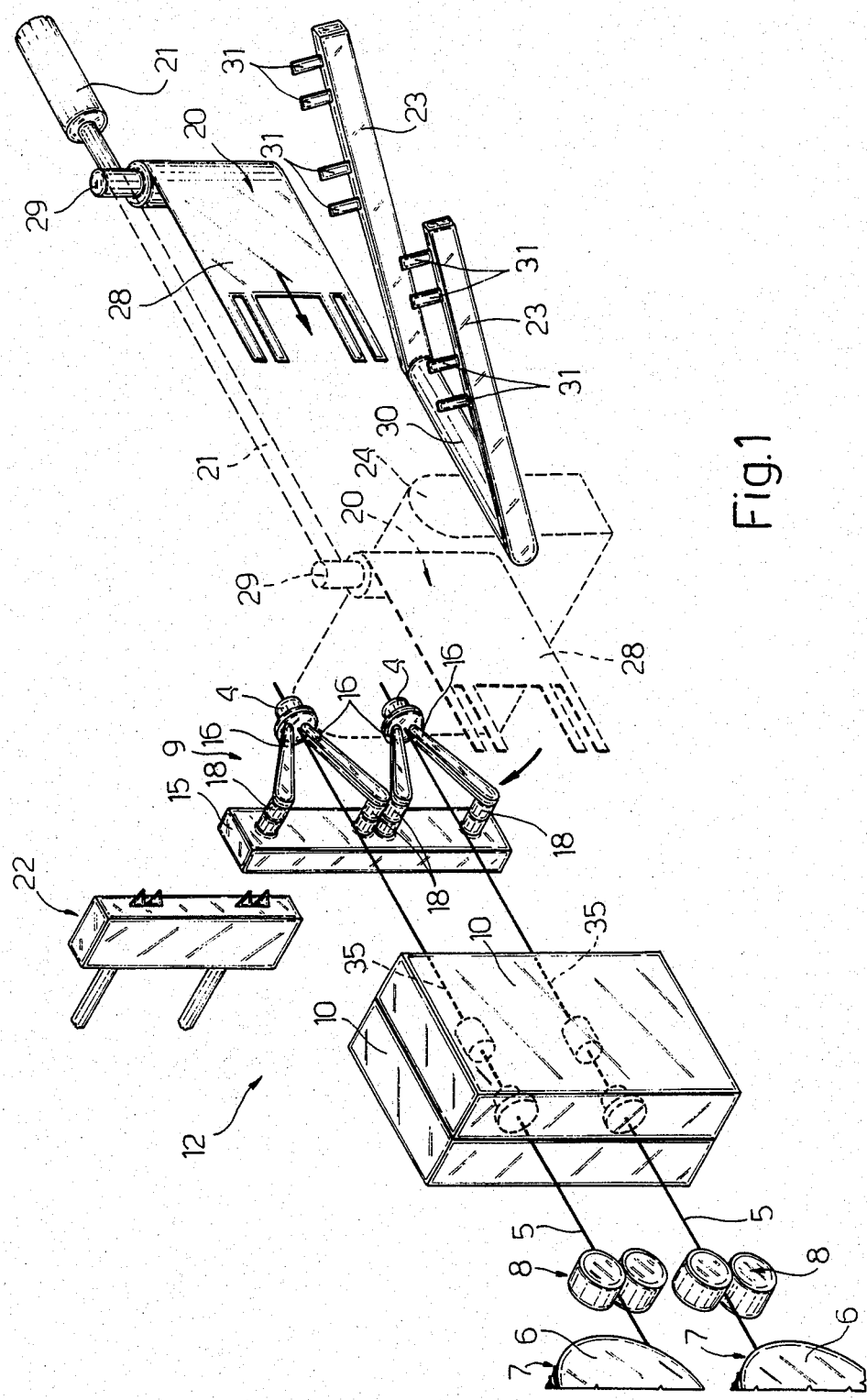
FIG. 1 schematically illustrates an apparatus suitable for performing the process of the invention, shown during a first step of the process.

With reference to FIG. 3, the process constituting the subject of the invention serves to produce flexible connectors of the type illustrated, and generally indicated with the reference numeral 1. The connector 1 comprises a segment 2 of predetermined length of a flexible cable, preferably constuituted by a strand of nylon cord or other equivalent material, and one or more attachment elements made of synthetic plastics material and rigidly fixed to the cable segment 2 particularly, but not exclusively, the process of the invention is adapted to produce flexible connectors 1 comprising a segment of cable 2 and a pair of different attachment elements 3 and 4, respectively shaped like a plug and an anchor, fixed on opposite ends of the cable segment 2.

Such a connector is usuable for the support of covers and luggage space cover panels on motor vehicles provided with rear hatchback doors.

The connector 1 can be obtained in a manner which will be described , starting from a continuous flexible cable 5 (FIG. 1), for example made in a known way of nylon strands, which is wound in a coil 7 on suitable freely rotatable drums 6 belonging to automatic apparatus 12 operable to maintain the cable 5 under tension, by means of respective friction devices 8 of known type disposed adjacent the drums 6, and by means of a stop device 9, between a pair of facing mould halves 10 of known type, which are relatively movable towards one another, for example forming part of an injection moulding machine of known type and not illustrated for simplicity, in turn forming part of the apparatus 12 as do the mould halves 10 and the devices 8 and 9. With reference to FIG. 4, each mould half 10 is provided internally with respective cavities 13 and 14 shaped, respectively, as the elements 3 and 4 which it is desired to obtain on the connectors 1 and disposed in pairs in adjacent positions along the axis of the cable 5; in particular, between the mould halves 10 are stretched a plurality (two or more) of cables 5, each of which is separately wound on a different drum 6 and cooperates with a different device 8 and with different elements of the device 9, and in correspondence with the axis of which the mould halves 10 are provided with facing pairs of cavities 13 and 14 disposed adjacent one another. In a preferrred embodiment of the invention the device 9 includes a fixed support 15 disposed at a predetermined, but adjustable, distance from the mould halves 10, and a pair of facing jaws 16 for each cable 5, carried movably (for example rotatably), on the support 15 in such a way as to be parallel to the associated cable 5 and relatively separable against the action of resilient means 18; in particular the jaws 16 are disposed in such a way as to define a V the vertex of which faces away from the mould halves 10 and is aligned with the cables 5, and are able to cooperate with the attachment elements 3 and 4 to retain them preventing any displacement towards the mould halves 10, and to be separated by the elements 3 and 4 themselves when the apparatus 12 is actuated, in a manner which will be explained, to translate the cables 5 parallel to their axes.

The apparatus 12 further includes a rotary gripper 20 translatable parallel to the cables 5, for example by means of an actuator 21, which is rotatable through 90° by means of a suitable servo-mechanism of any known type (for example a cam), not illustrated for simplicity, at its end-of-stroke positions a cutter device 22 disposed adjacent the device 9 and translatable perpendicularly of the cables 5; and a pair of lever-type grippers 23 operable to grip the connectors 1 produced and to deposit them astride a saddle-shape collection support 24. Preferably the gripper 20 is constituted by a simple plate 28 in the form of a comb rotatably carried by a pin 29 rigidly connected to the actuator 21, or, in another embodiment not illustrated for simplicity, is constituted by a normal movable jaw gripper of known type, still rotatably mounted on the pin 21; the lever-type grippers 23 are, on the other hand, both mounted on a common sleeve 30 rotatable about its axis in a reciprocating manner and operated in a suitable way by a motor, not illustrated for simplicity; the grippers 23 are provided with jaws 31 the opening and closure of which is controlled in dependence on the angular position of the sleeve 30 in such a way that these are closed when the grippers 23 are close to the vertical (FIG. 4) and are open when the grippers 23 are close to the horizontal (FIGS. 1, 2 and 5).

To obtain connectors 1 the process is as follows. First of all the cables 5 are unwound manually and passed between the mould halves 10 which are located in an open position spaced from one another, and then the unwound sections of the cables 5 are put under tension by engaging the opposite ends thereof in the devices 8 and 9; then the apparatus 12 is started, which from this moment can proceed automatically to effect the following operations.

The mould halves 10 are brought together (FIG. 1) in such a way as to clamp between them, in their cavities 13 and 14, a respective section 35 of each cable 5, and on these sections 35 the elements 3 and 4 are hot formed, for example by injection of synthetic resin in the molten state into the cavities 13 and 14 in a known way; given the relative positions of the cavities 13 and 14 and the cables 5, after this hot forming step the elements 13 and 14 of each cable 5 are disposed in adjacent positions, head-to-head, and are rigidly and securely fixed to the respective sections 35 of the cables 5 in that they have these latter embedded within them. At the end of the forming step the mould halves 10 are separated (FIG. 2) in such a way as to release the sections 35 of the cables 5 and consequently expel the newly-formed elements 3 and 4 from the cavities 13 and 14, the elements 3 and 4 are thus free to cool in the air; then the cables 5 are advanced parallel to their length in such a way as to unwind the coils 7 from the rolls 6 carrying the expelled elements 13 and 14 away from the mould halves 10 and simultaneously bringing a free section of the cables 5 between the mould halves 10 (FIG. 4) for a new forming operation; the advancement of the cables 5 is effected, according to the invention, by the gripper 20 which, during the forming step is caused to advance by the actuator 21 until it is at the same position as the device 9 and then caused to rotate about the pin 29 by 90° in such a way as to bring the comb 28 between the jaws 16 perpendicular to the cables 5 (FIG. 1); then the gripper 20 is retracted towards the support 24 (FIGS. 2 and 4) immediately after the separation of the mould halves 10 in such a way to engage the ends of the cables 5 retained in the jaws 16 and open out these latter to release the cables 5 and thus cause them to be drawn towards the grippers 23; following this advancement of the cables, the newly formed elements 3 and 4 are translated towards the device 9 until they come into cooperation with the jaws 16 moving them apart again and proceding beyond them (FIG. 4); these, under the reaction of the resilient means 18 then close again onto the cables 5 in correspondence with the rear elements 4 just formed, thus ensuring the maintenance of tension in the free sections of the cables 5 unwound from the coils 7. Finally, the mould halves 10 are brought together again for a new forming operation on the free section of the cables 5, which have been brought between them by advancement of the cables as a result of the traction by the gripper 20; simultaneously the grippers 23 rise and grip the sections of cable 5 stretched between grippers 20 and the device 9, and the device 22 is carried into contact with the cables 5 to cut these with respective blades 37 (FIG. 4) in correspondence with the elements 3 and 4 in the section lying between these latter and indicated 38 in FIG. 3. The cut-off piece of cable, of predetermined length which is adjustable by means of suitable positioning of the device 22, is then placed by the grippers 23 astride the saddler-shape support 24. At this point the end part of each cable 5 is retained by the jaws 16 and is provided with an element 4; by cyclically repeating the steps described, at each successive forming and cutting step identical sections of the cables 5 are successively located in correspondence with the mould halves 10 and, then, the device 22; at each translation the grippers 20 grip the elements 4 disposed between the jaws 16 separating them from these latter and carrying them beyond the grippers 23 and consequently carrying a new pair of adjacent elements 3 and 4 beyond the jaws 16. In this way, after each successice advancement of the cables 5 a segment 2 of predetermined length, which lies between the element 4 disposed on the free ends of the cables 5 (which is retained by the grippers 20) and the element 3 adjacent the element 4 disposed against the jaws 16, is stretched between the device 9 and the gripper 20 where it can be gripped by the grippers 23 and subsequently cut from the associated cable 5 by means of the blades 37 thereby obtaining on the grippers 23 the same number of connectors 1 as there are cables 5 (FIG. 5). These are subsequently deposited on the support 24 from which they can be collected manually in bundles, whilst the grippers 20 are again rotated into position parallel to the cables 5 ready for a new stroke.

From what has been described the advantages of the invention will be apparent; by operating with the sequence of steps described it is possible rapidly and efficiently to obtain connectors of any type and length, and the operations can be performed in an entirely automatic manner by means of simple and low cost apparatus on which, to change from one type of production to another, it is sufficient to replace the mould halves 10 and to adjust the position of the device 9 and the stroke of the gripper 20, independently of the number of elements which it is necessary to obtain on each connector. Only upon starting is it necessary to operate manually the unwinding of the coils of cable and possibly to ensure that the free end of the cables (in the case that the gripper 20 has fixed jaws and is therefore not able directly to grip the cable) is provided with a stop element able to allow the gripper 20 to operate the first withdrawal, subsequent withdrawals being ensured by the presence of the attachment elements moulded on the cable.

I claim:

1. A process for the production of connectors comprising a segment of flexible cable and a pair attachment elements of synthetic plastics materials rigidly connected to said cable segment, characterized by the fact that it comprises the steps of:
   (a) drawing a continuous flexible cable wound in a coil through a pair of facing relatively moveable mould halves;
   (b) closing the mould halves together in such a way as to clamp a section of said flexible cable between them and hot forming directly on said second a pair of spaced apart attachment elements of synthetic plastics material embedding said flexible cable in said pair;
   (c) separating said mould halves in such a way as to expel said pair of spaced apart attachment elements rigidly formed on said flexible cable;
   (d) advancing said cable parallel to its length in such a way as to unwind said coils and carry a free section of said flexible cable between said mould halves while carrying the previously expelled pair of attachment elements away from these latter to a gripper location;
   (e) gripping said cable segment by a pair of grippers;
   (f) cutting said section of said flexible cable between said pair of spaced apart attachment elements while maintaining a gripping hold on the attachment element still attached to said continuous flexible cable to maintain the section of flexible cable extending from said coil in a stretched condition;
   (g) depositing the detached portion of said flexible cable astride a collection support; and
   (h) repeating steps (b) through (g).

2. A process for the production of connectors comprising a segment of flexible cable and a pair attachment elements of synthetic plastics material rigidly connected to said cable segment, characterized by the fact that it comprises the steps of;
   (a) drawing a continuous flexible cable wound in a coil through a pair of facing relatively moveable mould halves;
   (b) closing the mould halves together in such a way as to clamp a section of said flexible cable between them and hot forming directly on said section a pair of spaced apart attachment elements of synthetic plastics material embedding said
   (c) separating said mould halves in such a way as to expel said pair of spaced apart attachment elements rigidly formed on said flexible cable;
   (d) advancing said cable parallel to its length in such a way as to unwind said coils and carry a free section of said flexible cable between said mould halves while carrying the previously expelled pair of attachment elements away from these latter to a gripper location, said flexible cable being maintained stretched by means of a friction device disposed adjacent said coil, and by means of stop device able to cooperate with the inner one of said pair of attachment elements and including a support carrying a movable pair of facing jaws which can be mutually separated against the action of resilient means;
   (e) cutting said section of said flexible cable between said pair of spaced apart attachment elements while maintaining a gripping hold on the attachment element still attached to said continuous flexible cable to maintain the section of flexible cable extending from said coil in a stretched condition;
   (f) advancing said inner one of said pair of attached elements by gripping it by means of rotatable grippers and by then making said rotatable grippers translate in a direction such as to separate them from the said mould halves until said inner one of said pair of attachment elements is brought into engagement with said jaws of the stop device; and
   (g) repeating steps (b) through (f).

* * * * *